(12) United States Patent
Bourdillon et al.

(10) Patent No.: US 11,293,728 B2
(45) Date of Patent: Apr. 5, 2022

(54) BALANCING ASSEMBLY COMPRISING BALANCING RINGS FOR A MISSILE AND MISSILE PROVIDED WITH SUCH A BALANCING ASSEMBLY

(71) Applicant: MBDA FRANCE, Le Plessis-Robinson (FR)

(72) Inventors: Rémi Bourdillon, Le Plessis-Robinson (FR); François Reisch, Le Plessis-Robinson (FR); Vincent Guibout, Le Plessis-Robinson (FR)

(73) Assignee: MBDA France, Le Plessis-Robinson (FR)

( * ) Notice: Subject to any disclaimer, the term of this patent is extended or adjusted under 35 U.S.C. 154(b) by 405 days.

(21) Appl. No.: 16/466,926

(22) PCT Filed: Nov. 28, 2017

(86) PCT No.: PCT/FR2017/000224
§ 371 (c)(1),
(2) Date: Jun. 5, 2019

(87) PCT Pub. No.: WO2018/104594
PCT Pub. Date: Jun. 14, 2018

(65) Prior Publication Data
US 2020/0064110 A1     Feb. 27, 2020

(30) Foreign Application Priority Data

Dec. 8, 2016   (FR) ...................................... 1601750

(51) Int. Cl.
*F42B 10/02*     (2006.01)
*F16F 15/32*     (2006.01)

(52) U.S. Cl.
CPC .............. *F42B 10/02* (2013.01); *F16F 15/32* (2013.01)

(58) Field of Classification Search
CPC .......... F42B 10/02; F42B 10/025; F16F 15/32
See application file for complete search history.

(56) References Cited

U.S. PATENT DOCUMENTS

| | | | | |
|---|---|---|---|---|
| 3,225,590 | A * | 12/1965 | Ward .................... | G01M 1/122 73/65.01 |
| 9,068,807 | B1 * | 6/2015 | Thomas .................. | F42B 15/10 |
| 2015/0041582 | A1 * | 2/2015 | Barthelemy ............ | F42B 15/01 244/3.1 |

FOREIGN PATENT DOCUMENTS

| | | |
|---|---|---|
| DE | 10 2011 102315 A1 | 11/2012 |
| GB | 549 189 A | 11/1942 |
| WO | 94/16852 A1 | 8/1994 |
| WO | 95/26258 A1 | 10/1995 |

(Continued)

OTHER PUBLICATIONS

International Search Report and Written Opinion dated Mar. 16, 2018, issued in corresponding International Application No. PCT/FR2017/000224, filed Nov. 28, 2017, 12 pages.

*Primary Examiner* — Christopher D Hutchens
(74) *Attorney, Agent, or Firm* — Christensen O'Connor Johnson Kindness PLLC

(57) ABSTRACT

Missile balancing assemblies include two balancing rings configured for mounting on a missile, each balancing ring having a ballast. Each balancing ring is configured to be rotated and rotationally fixed, and may include materials having different densities at different locations. Each balancing ring may further include an angular graduation.

14 Claims, 3 Drawing Sheets

(56) References Cited

FOREIGN PATENT DOCUMENTS

WO           96/41113 A1    12/1996
WO    2013/144460 A1    10/2013

\* cited by examiner

BALANCING ASSEMBLY COMPRISING BALANCING RINGS FOR A MISSILE AND MISSILE PROVIDED WITH SUCH A BALANCING ASSEMBLY

The present invention relates to a balancing assembly for a missile and a missile provided with such a balancing assembly.

In the scope of the present invention, by "missile", is meant any flying engine having a partially cylindrical outer structure and provided with propulsion means, and which is preferably guided. Although not exclusively, the present invention relates more specifically to tactical missiles.

It is known that, for a certain number of uses, it is essential to precisely control the radial position of the centre of gravity of such a missile. Generally, the usual solutions to do this consist of fixing discrete masses, on the structures, according to the individual balancing need of each missile.

Thus, it is known to balance the missile using compact metal centrifugal weights, massive and heavy, these centrifugal weights being fixed on the missile, for example by bolting.

Such a known procedure of balancing a missile is as long and complex, as it is manual and iterative. In addition, it is potentially dangerous, as it exposes the production staff for a significant time to the active missile. Moreover, during the detonation of the charge of the missile, or during the accidental explosion of the propellant of the missile, these compact balancing centrifugal weights are projected in all directions. Also, according to the detonation connection of the charge, the projection of these explosions can cause collateral damage (shooter, firing post, etc.).

Moreover, by document FR-2 644 937, balancing centrifugal weights are known for a tactical missile could rotate about the longitudinal axis thereof. These balancing centrifugal weights have the aim of simplifying the balancing procedure of the rolling tactical missile, by avoiding the use of dangerous tools and by preventing the balancing centrifugal weights from being able to be transformed into dangerous projectiles. To do this, each balancing centrifugal weight is constituted by shot which is confined in a closed packaging. Under the effect of the detonation of a charge or of a possible explosion of the propellant, the packaging of the shot is disintegrated and the shot forms a low-energy spray, because of the smallness and the dispersion of pellets. The centrifugal weights cannot therefore be transformed into dangerous projectiles.

Furthermore, the tactical missile is provided with air cells capable of receiving the balancing centrifugal weights. Such air cells are, preferably, made in the inner face of at least one aerodynamic cowling of said missile. In a variant, the air cells can be accessible from the outside, through windows which are possibly blocked after setting up the balancing centrifugal weights.

This solution which makes it possible to reduce the collateral effects, however, requires a certain duration for setting up the weights.

On a broader level, the usual balancing solutions therefore require adding to each missile, depending on need, one or more balancing centrifugal weights on the structures. This balancing operation generally requires revealing a portion of the missile. In addition, the addition of these centrifugal weights generates a variation in mass and centring from one missile to another, and therefore performance. Furthermore, the trajectory of these centrifugal weights, after impact, is generally not controlled. Moreover, the setting up of such balancing centrifugal weights is generally done section by section, which requires a relatively long assembly time.

The present invention relates to a balancing assembly for a missile, which makes it possible to overcome the above-mentioned disadvantages.

According to the invention, the balancing assembly comprises two balancing rings intended to be mounted on the missile, each of said balancing rings comprising a ballast which is located on the corresponding balancing ring, each of said balancing rings being capable of being rotated and of being fixed in a given angular position.

Thus, according to the invention, on the missile, two rotating balancing rings with eccentric ballast are arranged, of which the angular position about the longitudinal axis can be adjusted so as to correct the natural static balancing imbalance of the missile. This adjustment of the angular position (about the longitudinal axis) of the two balancing rings is possible from the outside of the missile, without disassembling the structures, as specified below.

Consequently, according to the invention, a balancing assembly making it possible to adjust the radial position of the centre of gravity of the missile is obtained, without modifying the mass thereof and the longitudinal centring thereof, and without having to carry out the disassembly at the time of the balancing operation (or method), which facilitates this balancing operation.

In a preferred embodiment, each of said balancing rings comprises a ring made of a first material having a first density, and the ballast is integrated into this ring and is made of a second material, for example tungsten, having a second density which is greater than said first density. Preferably, for each of said balancing rings, the ballast is integrated in a section in a circular arc of the ring. Advantageously, the ballast is fixed, preferably glued, in the ring.

Moreover, in a preferred embodiment, said ballast comprises shot which is coated in a resin. This preferred embodiment makes it possible to avoid the ballast becoming a dangerous projectile, in case of detonation of the charge in particular, the resin being disintegrated under the detonation of the charge.

Advantageously, each of said balancing rings is provided with a peripheral angular graduation, said ballast being arranged at a given angular position with respect to said angular graduation. Preferably, the two balancing rings are arranged coaxially, next to one another, with the angular graduations thereof facing one another.

Furthermore, in an advantageous embodiment, each of said balancing rings is provided with an assembly of adjustment holes distributed around the periphery of the corresponding ring.

The present invention also relates to a missile.

According to the invention, said missile is provided with a balancing assembly such as that described above, the balancing rings of said balancing assembly being mounted on the missile coaxially to a longitudinal axis of said missile so as to be able to be driven in rotation about this longitudinal axis.

In a first embodiment, the balancing assembly is mounted on a face of the missile, radially external with respect to the longitudinal axis of said missile and is directly accessible from the outside.

Furthermore, in a second embodiment, the balancing assembly is mounted inside an outer structure of the missile, said outer structure being provided with at least one window making it possible to access, from the outside, at least one portion of each of the balancing rings.

Advantageously, the missile also comprises fixing means configured to stop rotation of each said balancing rings in a given angular position.

The present invention relates, furthermore, to a method for balancing a missile such as that abovementioned. According to the invention, said balancing method comprises the following successive steps:

a first measuring step consisting of placing the missile on a balancing bench provided with three measuring points, in a first position, and to measure, in this first position, first weight values of said missile, measured respectively, at said three measuring points;

a second measuring step consisting of rotating the missile by 90° about the longitudinal axis thereof with respect to the first position to bring it into a second position on the balancing bench, and to measure, in this second position, second weight values of said missile, measured respectively, at said three measuring points;

a first calculation step consisting of calculating, from the first and second weight values measured at said first and second measuring steps, coordinates in a plane transverse to the centre of gravity of the missile;

a second calculation step consisting of calculating, from coordinates of the centre of gravity and of predetermined angular positions of the two balancing rings, for each of said balancing rings, an adjustment angular position, making it possible to position the centre of gravity in a predetermined zone in the transversal plane (of the missile); and an adjustment step consisting of bringing each of two balancing rings into the adjustment angular position thereof thus calculated.

Advantageously, the balancing method comprises, in addition, a verification step implemented after the adjustment step and consisting of verifying, by implementing the first and second measuring steps and the first and second calculation steps, if the positioning of the centre of gravity is located in a predetermined zone in a transversal plane of the missile, and if not, to make an adjustment again by implementing the adjustment step.

Steps of the method, in particular the step of rotating the missile and the adjustment step, can be carried out at least partially manually. However, in a preferred embodiment, the assembly of said steps of the method is implemented automatically.

The figures of the appended drawing will enable the invention to be well understood. In these figures, identical references designate similar elements.

FIG. 1 schematically shows, in perspective, a tactical missile example, to which is the present invention is applied.

Figure 4:
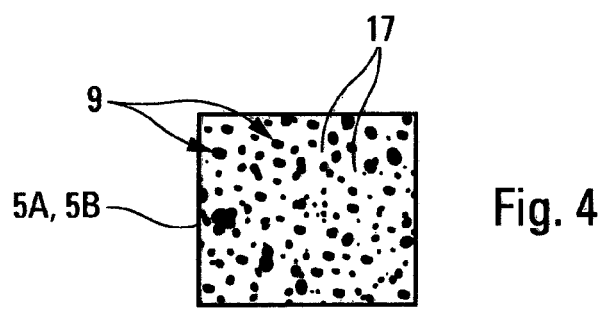

FIG. 4 schematically shows an embodiment variant of a ballast of a balancing ring.

Figure 5:
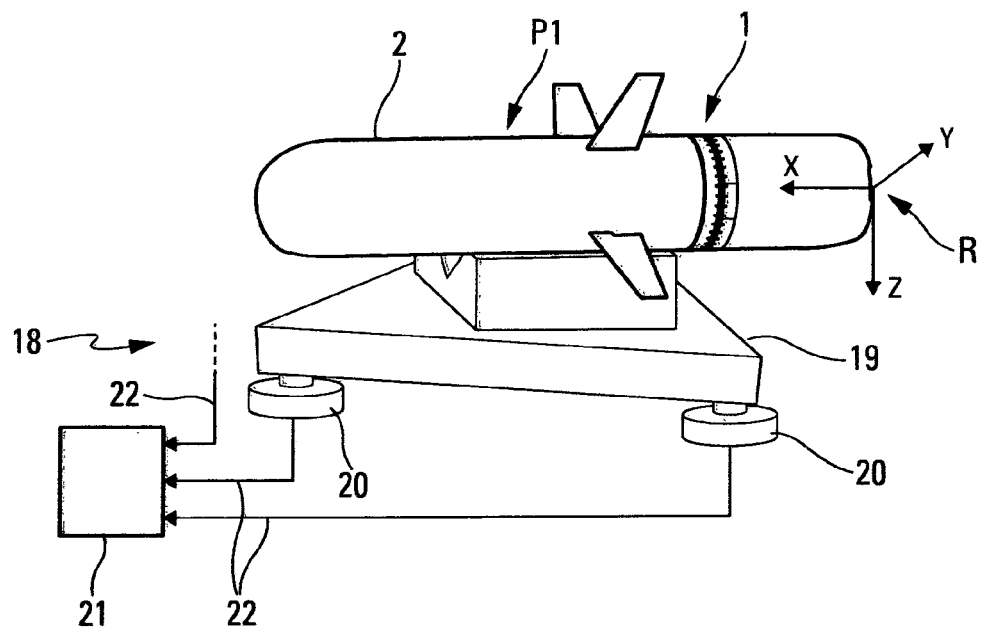
Figure 6:
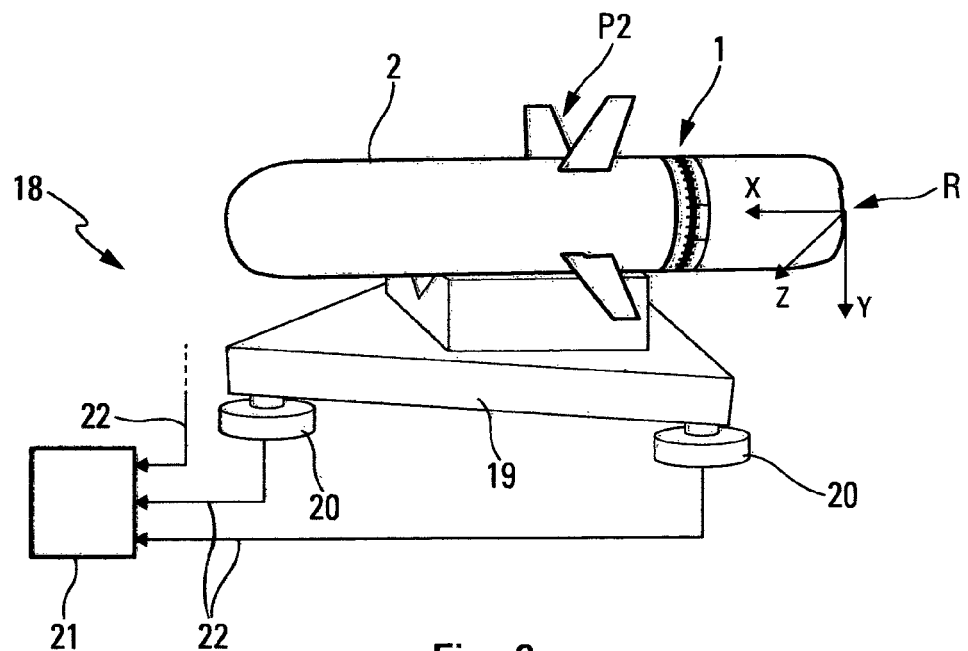

FIGS. 5 and 6 how two successive specific steps of a method for balancing the missile, which is mounted on a balancing bench, respectively in two different positions.

Figure 7:
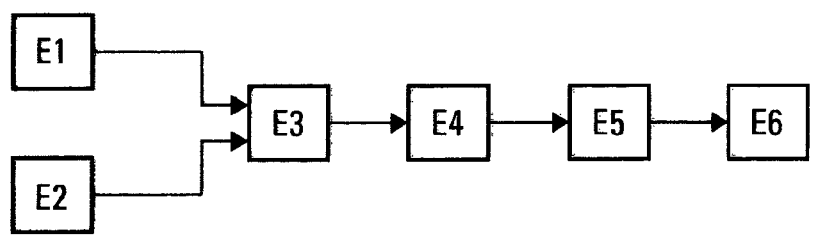

FIG. 7 is the synoptic diagram of a method for balancing a missile provided with a balancing assembly according to the invention.

Figure 1:
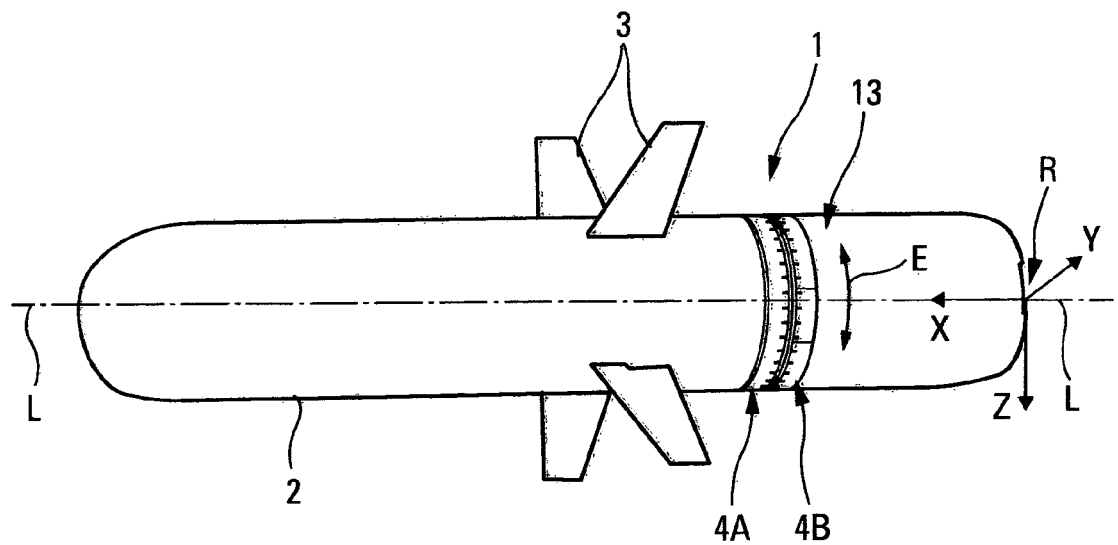

The missile 2, shown as an example in FIG. 1, to which the present invention is applied, comprises wings (or blades) 3 for its guidance, for rotating it about the longitudinal axis L-L thereof in the case of a missile rotating about the longitudinal axis thereof.

In the following description, a marking R associated with the missile 2 and defined about three axes is used, namely an axis X which is oriented about said longitudinal axis L-L towards the front of the missile 2, and two axes Y and Z which define a transversal plane YZ which is orthogonal to said axis X.

The present invention can be applied to any type of missile 2. This missile 2 is provided with a balancing assembly 1.

Figure 2:
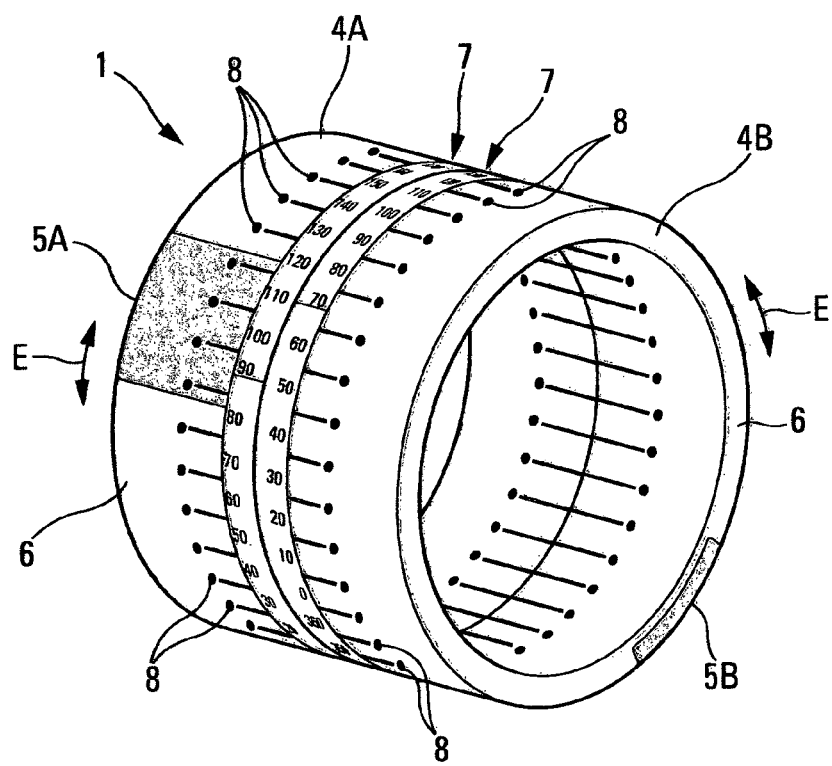
FIG. 2 is a view, in perspective, of two balancing rings of a balancing assembly.

According to the invention, the balancing assembly 1 comprises two balancing rings 4A and 4B intended to be mounted on the missile 2. As represented in FIG. 2, each of said balancing rings 4A and 4B comprises a ballast 5A, 5B which is located on a reduced zone of the corresponding balancing ring 4A, 4B.

Each of said balancing rings 4A and 4B is configured to be able to be driven in rotation and to be fixed in a given angular position.

More specifically, the balancing rings 4A and 4B are mounted on the missile 2, coaxially to the longitudinal axis L-L thereof, so as to be able to be driven in rotation about this longitudinal axis L-L, as illustrated by double arrows E in FIGS. 1 and 2.

In the scope of the present invention, the balancing assembly 1 comprises a rotation system (not represented), capable of making it possible for the rotation of the balancing rings 4A and 4B. It can be any system capable of generating such a rotation. As an illustration, this rotation system can comprise, for each balancing ring, one or more circular rails mounted on the missile, as well as associated means making it possible to move the balancing ring on this or these rail(s).

In a preferred embodiment, as can be seen on a greater scale in FIG. 2, each of the balancing rings 4A and 4B comprises a ring 6 made of a first material having a first density. The ballast 5A, 5B is integrated in this ring 6. In addition, it is made of a second material, for example tungsten, which has a second density which is greater than said first density.

This second density is, preferably, at least 150 times greater than the first density. As a non-limiting illustration, the first material, of which the ring 6 is made, can, in particular, be a thermoplastic material, an expanded polypropylene foam, or a polymethacrylate foam.

Thus, using this first material, generally light balancing rings 4A and 4B are obtained, making it possible to not generate an additional significant and disadvantageous weight, except for the ballast 5A, 5B which is heavier so as to be able to effectively fulfil the ballast role thereof.

For each of the balancing rings 4A and 4B, the ballast 5A, 5B is integrated and fixed in a circular arc-shaped section of the ring 6. In a specific embodiment, the ballast 5A, 5B is glued in the ring 6.

Thus, by this arrangement of the ballast 5A, 5B in a localised zone (or portion or section of reduced size) of the ring 6, a balancing ring 4A, 4B is obtained, having a non-homogenous mass distribution with a localised eccentric ballast, of which the position is known on the ring 6.

Each of the balancing rings 4A, 4B is provided with a peripheral angular graduation 7, arranged around the whole periphery of the balancing ring 4A, 4B. This angular graduation 7 is provided with markings positioned for example, 10° at a time. The ballast 5A, 5B is arranged at a given angular position with respect to this angular graduation 7, as an example between values of around 80° and 120 ° for the ballast 5A of FIG. 2.

In the preferred embodiment shown in FIGS. 1 and 2, the two balancing rings 4A and 4B are arranged coaxially next to one another with the angular graduations 7 thereof facing one another, which, in particular, makes it possible to facilitate the adjustment and the reduce the volume.

Furthermore, in a specific embodiment, each of the balancing rings 4A and 4B is provided with a set of adjustment holes 8 distributed around the periphery of the corresponding ring 6, as shown in FIG. 2. The adjustment holes 8 of a balancing ring 4A, 4B make it possible for an operator to act on the balancing ring 4A, 4B, for example, using a stylus which is inserted into an adjustment hole 8 and which is moved to make the adjustment ring 4B, 4B rotate.

In this specific embodiment, the rotation is carried out in steps, each rotation step being equal to the angular difference between two successive adjustment holes 8, for example, 10°.

Moreover, in a specific embodiment, shown in FIG. 4, the ballast 5A, 5B comprises the shot 9, i.e. that it is fragmented. This shot 9 which has a reduced grain size, is coated in a resin 17. This specific embodiment makes it possible to avoid the ballast 5A, 5B becoming a dangerous projectile, in particular in case of detonation of the charge of the missile. Indeed, the ballast 5A, 5B thus formed of shot is broken up during the detonation of the charge in a spray of explosions of a lesser size and therefore of low energy, which makes it possible to avoid or at the very least, reduce the collateral effects.

The missile 2 also comprises fixing means 10 configured to stop rotation of each of said balancing rings 4A, 4B in a given angular position.

These fixing means 10 can comprise clips, screws or pins for example, which are inserted into holes or notches provided in the balancing rings 4A and 4B to stop them rotating.

Figure 3:
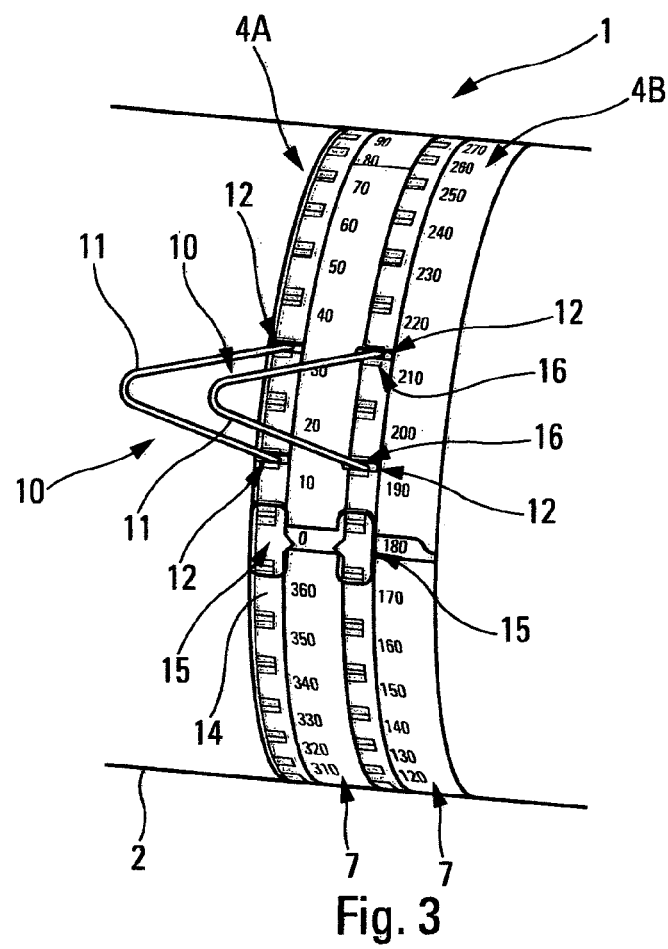
FIG. 3 is a view, in perspective, of an embodiment variant of a balancing assembly mounted on a section of a missile.

In the example of FIG. 3, a fixing clip 11 has been shown as fixing means 10, for each of the balancing rings 4A and 4B, which is intended to fix in position the corresponding balancing ring 4A, 4B in order to prevent it from rotating. In the example shown, each fixing clip 11 comprises two assembled V-shaped branches, and the free ends of these branches go into two holes 12 made in the fixing ring 4A, 4B. These holes 12 can be holes dedicated to the fixing.

However, in a preferred embodiment, these holes 12 are adjustment holes, such as adjustment holes 8 shown in FIG. 2, and are therefore also intended to make it possible for gripping, via a tool such as a stylus, to make it possible for an operator to make the balancing ring 4A, 4B rotate.

Thus, according to the invention, on the missile 2, two rotating balancing rings with eccentric ballast 4A and 4B are arranged, of which the respective angular positions about the longitudinal axis L-L can be adjusted so as to correct the natural balancing static imbalance of the missile 2. The correction is obtained by bringing the two ballasts 5A and 5B to angular positions for which the respective masses thereof move the centre of gravity of the missile in the transversal plane YZ to bring it back to the centre, i.e. on the longitudinal axis L-L, or at the very least, to a maximum acceptable distance from this longitudinal axis. As an example, if the missile has no natural static imbalance, the two balancing rings 4A and 4B are rotated to bring the two ballasts 5A and 5B on the same diameter of the body of the missile, on either side of the centre, such that the respective effects thereof on the centre of gravity is compensated and does not move the centre of gravity.

This adjustment of the angular position (about the longitudinal axis L-L) of the two balancing rings 4A and 4B is possible from the outside of the missile 2, without disassembly of the structures, as specified below.

Consequently, according to the invention, a balancing assembly 1 making it possible to adjust the radial position is obtained (in the transversal plane YZ) of the centre of gravity of the missile 2 to bring it back to the centre of said missile 2, and this:
without modifying the mass thereof, since the balancing rings 4A and 4B are fitted during the production of the missile 2 and that no additional mass is added to achieve the adjustment;
without modifying the longitudinal centring thereof (about the axis X), since the rotation of the balancing rings 4A and 4B moves the ballasts 5A and 5B in the transversal plane YZ but not about the longitudinal axis, each ballast 5A, 5B being maintained in the same longitudinal position (about the axis X); and
without having to carry out the disassembly at the time of the balancing operation which facilitates the adjustment.

In the embodiment shown in FIGS. 1 and 2, the balancing assembly 1 is mounted on a face 13 of the missile 2, which is radially external with respect to the longitudinal axis L-L of said missile 2. The balancing rings 4A and 4B are therefore directly accessible from the outside for the adjustment and the fixing, in particular.

Furthermore, in a variant, the balancing assembly 1 can be mounted inside an outer structure 14 of the missile 2, as shown in FIG. 3. The outer structure 14 of the missile 2, which is shown as transparent in FIG. 3, is thus provided with windows 15 and 16 obtained, for example, by a cut in this outer structure 14. These windows 15 and 16 make it possible to access from the outside to the portions of each of the balancing rings 4A and 4B for the rotation thereof (window 15) and the fixing thereof (the windows 16 making it possible to access the holes 12, in particular).

The balancing assembly 1, such as described above, makes it possible to use identical parts (balancing rings) whatever the missile on which it is mounted, and these parts are fitted to the missile before the adjustment of the balancing, which constitutes a substantial increase in productivity (with a reduced integration time).

The balancing assembly 1, such as described above, therefore makes it possible, by a suitable adjustment of the balancing rings 4A, 4B each provided with a localised ballast 5A, 5B, to effectively balance the missile 2.

The adjustment of the balance of a missile 2 provided with such a balancing assembly 1 is carried out using a balancing method specified below, in reference to FIGS. 5 and 6, by using a balancing bench 18.

The balancing bench 18 comprises:
a plate 19 suitable for receiving the missile 2 and comprising rotation means (not shown) making it possible to ensure the rotation of the missile by 90° about the longitudinal axis thereof (the axis X);
three measuring units 20 (or weight sensors (scales)) positioned in a triangle under the plate 19, of which only two can be seen in FIGS. 5 and 6, which make it possible to each weigh the assembly formed of the plate 19 and of the missile 2; and
a calculation unit 21 making it possible to analyse the values measured by the three measuring units 20 and received via connections 22.

Before starting the balancing method, the balancing rings 4A and 4B are positioned in a known angular position, and identical each time. This position is an item of entry data of the calculation unit 21.

The balancing method comprises the following successive steps, shown in FIG. 7:
- a measuring step E1 consisting of placing the missile 2 on the balancing bench 18 (provided with three measuring points each provided with a measuring unit 20) in a first position P1, as shown in FIG. 5, and to measure, in this first position P1, using measuring units 20, first weight values of said missile 2, at said three measuring points. For the measuring step E1, the missile 2 is, for example, positioned flat on the plate 19, with the axis Z towards the bottom:
- a measuring step E2 consisting of rotating the missile by 90° on the balancing bench 18, using rotation means (not shown), with respect to the first position P1 to bring it into a second position P2, and to measure, in this second position P2, as shown in FIG. 6, using measuring units 20, second weight values of said missile 2 at said three measuring points. In the measuring step E2, the missile 2 is therefore rotated of 90° about the axis X and is positioned in the same axial position (about the axis X) and on the same plate 19 as in the measuring step E1;
- a calculation step E3 consisting of calculating, using the calculation unit 21 linked to said measuring units 20 by way of connections 22, from the first and second weight values measured in said measuring steps E1 and E2, coordinates of the centre of gravity in the transversal plane YZ of the missile 2;
- a calculation step E4 consisting of calculating, from the coordinates of the centre of gravity and from predetermined angular positions of the two balancing rings 4A and 4B, for each of said balancing rings 4A and 4B, an angular adjustment position, making it possible to position the centre of gravity of the missile 2 in a predetermined zone in the transversal plane YZ. Preferably, this predetermined zone is centred at the level of the transversal cross-section of the missile, around the intersection point between the longitudinal axis and this transversal cross-section; and
- an adjustment step E5 consisting of bringing each of the two balancing rings 4A and 4B into the angular adjustment position thereof, thus calculated in the calculation step E4.

The balancing method comprises, in addition, a verification step E6 implemented after the adjustment step E5 and consisting of verifying, by implementing the measuring steps E1 and E2 and the calculation steps E3 and E4, if the positioning of the centre of gravity is located in a predetermined zone in the transversal plane YZ of the missile, and if not, to make an adjustment again.

Below, some of the abovementioned steps of the balancing method are specified.

In the calculation step E3, analysing weight values measured by each of the three measuring units 20 in the measuring step E1 makes it possible to obtain the coordinate y of the centre of gravity of the missile 2 about the axis Y.

In addition, in this calculation step E3, analysing the weight values measured by each of the three measuring units 20 in the measuring step E2 makes it possible to obtain the coordinate z of the centre of gravity of the missile 2 about the axis Z.

These different results are then combined so as to obtain the coordinates of the centre of gravity of the missile 2 about the axes Y and Z, which are therefore respectively: y and z.

In the calculation step E4, the distance between, on the one hand, the position of the centre of gravity in the transversal plane YZ and, on the other hand, the axis X, is calculated, and it is compared at an acceptable maximum distance.

According to the result of this comparison:
- if the calculated distance is less than or equal to said acceptable maximum distance, the adjustment method is stopped, the centre of gravity being correctly positioned; and
- if the calculated distance is greater than this acceptable maximum distance, the adjustment step E5 is implemented.

To this end, the calculation unit 21 calculates, in the calculation step E4, the distance and the direction in which the centre of gravity of the missile 2 must be moved, such that the distance thereof with respect to the axis X is reduced and becomes acceptable (i.e. less than said acceptable maximum distance).

Knowing the initial angular position of the balancing rings 4A and 4B, and their physical characteristics (geometry, mass, position of their centre of gravity, discretisation (step) of the angular adjustment), the calculation unit 21 then calculates the rotation that must be applied to each of them to move the centre of gravity of the missile 2 at an acceptable distance of the axis X.

As each balancing ring is angularly graduated on the periphery thereof, and each graduation can be seen from the outside of the missile, it is then easier during the adjustment step E5 to angularly move the balancing rings 4A and 4B according to the results obtained in the calculation step E4.

This operation can be carried out manually by an operator using a stylus type tool, or automatically, as specified below.

Once the balancing rings 4A and 4B are positioned angularly according to the results of the calculations obtained in the calculation step E4, in the verification step E6, it is verified if the balancing method has actually been effective. If the adjustment is correct, the balancing rings 4A and 4B are angularly fixed from the outside of the missile 2, with fixing means 10 such as clips 11, screws or pins which are inserted in the holes 12 of the balancing rings 4A and 4B. If the adjustment is not correct, the abovementioned steps are carried out again.

It can be envisaged, that the angular adjustment of the position of the balancing rings 4A and 4B is carried out manually, or automatically and robotically. In the latter case, the balancing bench 18 must be completely automated, and all the elements of this balancing bench 18 must be configured to carry out the respective functions thereof automatically. By carrying out the angular adjustment of the position of the balancing rings automatically, it is possible to minimise the time spent by the missile in the pyrotechnic cell, which generates a cost gain, and the adjustment can be carried out without an operator in the pyrotechnic cell, which is advantageous in terms of safety.

The present invention therefore makes it possible:
- to statically balance a missile 2 without affecting the longitudinal centring thereof nor the mass thereof, therefore without affecting the performance thereof; and
- to proceed with the balancing of the missile 2 at the end of integration of the missile (therefore on the complete missile), which makes it possible to limit the duration of the balancing method and therefore the production of the missile.

The invention claimed is:
1. A balancing assembly for a missile, comprising:
two balancing rings configured to be mounted on the missile, each of said balancing rings comprising a ballast located on the corresponding balancing ring each of said balancing rings being configured to rotate and to be fixed in a plurality of angular positions, wherein each of said balancing rings comprises a ring made of a first material having a first density, and wherein for each of said balancing rings, the ballast is integrated into the ring made of the first material, the ballast being made of a second material having a second density which is greater than said first density.

2. The balancing assembly according to claim 1, wherein for each of said two balancing rings, the ballast is integrated into a circular arc-shaped section of the ring made of the first material.

3. The balancing assembly according to claim 2, wherein for each of said balancing rings, the ballast is fixed in the ring made of the first material.

4. The balancing assembly according to claim 3, wherein each of said balancing rings has a peripheral angular graduation, and wherein for each of said balancing rings, said ballast is arranged at a given angular position with respect to said peripheral angular graduation.

5. The balancing assembly according to claim 4, wherein the two balancing rings are arranged coaxially, next to one another, with the peripheral angular graduations of the two balancing rings facing one another.

6. The balancing assembly according to claim 5, wherein each of said balancing rings has a set of adjustment holes distributed around a periphery thereof.

7. A missile comprising the balancing assembly claim 5, wherein the two balancing rings of said balancing assembly are mounted on the missile coaxially along a longitudinal axis of said missile so as to be configured to rotate about the longitudinal axis.

8. The missile according to claim 7, wherein the balancing assembly is mounted on a face of the missile that is radially external with respect to the longitudinal axis of said missile.

9. The missile according to claim 7, wherein the balancing assembly is mounted inside an outer structure of the missile, said outer structure having at least one window enabling access through the outer structure to each of the balancing rings.

10. The missile according to claim 7, further comprising fixing means configured to rotationally fix each of said balancing rings.

11. A method for balancing the missile of claim 7, comprising the following successive steps:

a first measuring step that includes placing the missile on a balancing bench provided with at least three measuring points, in a first position, and measuring, in the first position, a first plurality of weight values of said missile measured respectively at said three measuring points;

a second measuring step that includes rotating the missile by 90° about the longitudinal axis thereof with respect to the first position to bring the missile into a second position on the balancing bench, and measuring, in the second position, a second plurality of weight values of said missile measured respectively at said three measuring points;

a first calculation step that includes calculating, from the first plurality of weight values and the second plurality of weight values measured at said first and second measuring steps, a set of coordinates in a transversal plane of a center of gravity of the missile;

a second calculation step that includes calculating, from the set of coordinates of the center of gravity and from a plurality of predetermined angular positions of the two balancing rings, an angular adjustment position for each of said balancing rings, the angular adjustment position of each of the two balancing rings being calculated to position the center of gravity of the missile in a predetermined zone in the transversal plane; and an adjustment step that includes rotating each of the two balancing rings into the angular adjustment position thereof.

12. The method for balancing a missile according to claim 11, further comprising a verification step implemented after the adjustment step that includes verifying, by implementing the first and second measuring steps and the first and second calculation steps, if the center of gravity of the missile is located in the predetermined zone in the transversal plane of the missile, and if not, to again implement the adjustment step.

13. The method for balancing a missile according to claim 11, wherein said steps of the method are implemented automatically and robotically.

14. The balancing assembly according to claim 1, wherein for each of said balancing rings, said ballast comprises shot which is coated in a resin.

* * * * *